United States Patent
Chen

(10) Patent No.: US 8,364,996 B2
(45) Date of Patent: Jan. 29, 2013

(54) POWER CONTROL DEVICE AND POWER CONTROL METHOD APPLIED TO COMPUTER SYSTEM

(75) Inventor: Keng-Chih Chen, Taipei (TW)

(73) Assignee: ALI Corporation, Taipei (TW)

( * ) Notice: Subject to any disclaimer, the term of this patent is extended or adjusted under 35 U.S.C. 154(b) by 1162 days.

(21) Appl. No.: 12/237,368

(22) Filed: Sep. 24, 2008

(65) Prior Publication Data

US 2009/0276638 A1 Nov. 5, 2009

(30) Foreign Application Priority Data

Apr. 30, 2008 (CN) .......................... 2008 1 0095975

(51) Int. Cl.
*G06F 1/00* (2006.01)

(52) U.S. Cl. ........................................ 713/322; 713/300

(58) Field of Classification Search .................. 713/322, 713/300, 320
See application file for complete search history.

(56) References Cited

U.S. PATENT DOCUMENTS

2002/0129196 A1* 9/2002 Volk et al. ..................... 711/105
2005/0188189 A1* 8/2005 Yeung et al. ...................... 713/1

FOREIGN PATENT DOCUMENTS

| CN | 1938685 A | 3/2007 |
|---|---|---|
| WO | 2005078580 A1 | 8/2005 |

* cited by examiner

*Primary Examiner* — Clifford Knoll

(74) *Attorney, Agent, or Firm* — Winston Hsu; Scott Margo

(57) ABSTRACT

The present invention provides a power control device and a power control method applied to a computer system. The power control device includes a data processing unit, a throughput determining module, and a clock control unit. The data processing unit is utilized for processing and outputting data according to an adjustable clock rate. The throughput determining module is coupled to the data processing unit, and utilized for obtaining an indication value corresponding to a data output rate of the data processing unit and comparing the indication value with at least a predetermined threshold value to generate a comparing result. The clock control unit is coupled between the throughput determining module and the data processing unit, and utilized for adjusting the adjustable clock rate of the data processing unit according to the comparing result.

19 Claims, 9 Drawing Sheets

POWER CONTROL DEVICE AND POWER CONTROL METHOD APPLIED TO COMPUTER SYSTEM

BACKGROUND OF THE INVENTION

1. Field of the Invention

The present invention relates to a power control device and a power control method applied to a computer system, and more particularly, to a power control device and a power control method applied to a computer system that are capable of saving power consumption of the computer system by adjusting clock rate of internal elements of the computer system.

2. Description of the Prior Art

In general, when dealing with compressed data in a traditional computer system, there may be variations in the compressing rate, data property, and the user operation, and thus the requirements of the MIPS (millions of instructions per second) for the decoding terminal and the encoding terminal are different during the process. In order to attain the real-time processing for all the data, the prior art has to consider with the worst condition and set a maximum clock rate for a processing unit of the traditional computer system. In other words, the prior art has to set the maximum clock rate for the processing unit by focusing on a maximum requirement of the MIPS. However, this setting will waste power when the MIPS requirement is smaller than the maximum requirement.

SUMMARY OF THE INVENTION

It is therefore one of the objectives of the present invention to provide a power control device and a power control method applied to a computer system that are capable of saving power consumption of the computer system by adjusting clock rate of internal elements of the computer system, so as to solve the above problem.

In accordance with an embodiment of the present invention, a power control device applied to a computer system is disclosed. The power control device comprises a data processing unit, a throughput determining module, and a clock control unit. The data processing unit is utilized for processing and outputting data according to an adjustable clock rate. The throughput determining module is coupled to the data processing unit, and utilized for obtaining an indication value corresponding to a data output rate of the data processing unit and comparing the indication value with at least a predetermined threshold value to generate a comparing result. The clock control unit is coupled between the throughput determining module and the data processing unit, and utilized for adjusting the adjustable clock rate of the data processing unit according to the comparing result.

In accordance with an embodiment of the present invention, a power control method applied to a computer system is disclosed, wherein the computer system comprises a data processing unit utilized for processing and outputting data according to an adjustable clock rate, and the power control method comprises: obtaining an indication value corresponding to a data output rate of the data processing unit; comparing the indication value with at least a predetermined threshold value to generate a comparing result; and adjusting the adjustable clock rate of the data processing unit according to the comparing result.

Briefly summarized, the power control device and the power control method applied to a computer system disclosed by the present invention are capable of saving power consumption of the computer system by adjusting clock rate of internal elements (such as the data processing unit, the output buffer, the data outputting unit, the input buffer, and the data inputting unit) of the computer system.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
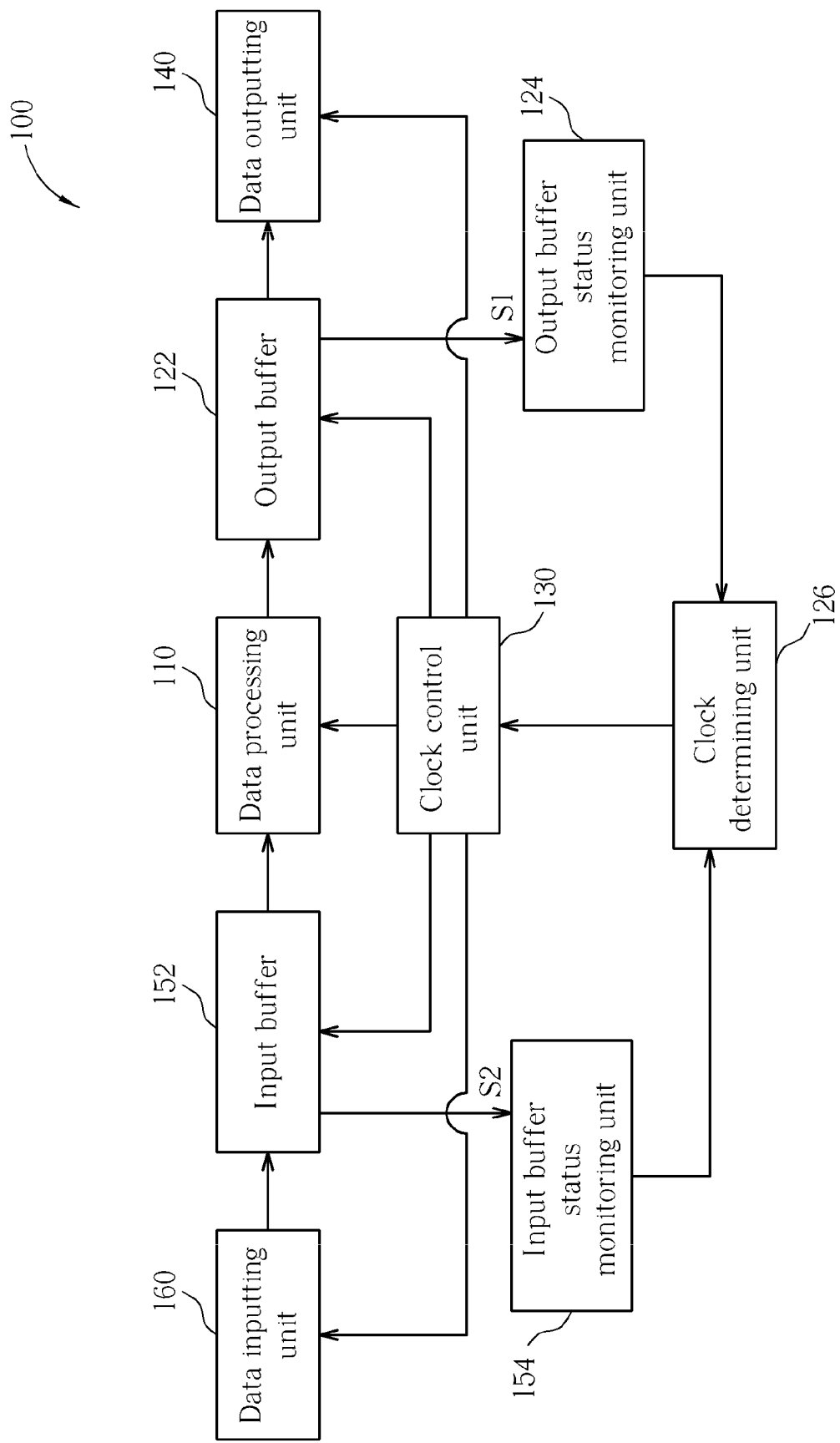
FIG. 1 shows a simplified block diagram of a power control device in accordance with a first embodiment of the present invention.

Please refer to FIG. 1. FIG. 1 shows a simplified block diagram of a power control device 100 in accordance with a first embodiment of the present invention. As shown in FIG. 1, the power control device 100 comprises a data processing unit 110, an output buffer 122, an output buffer status monitoring unit 124, a clock determining unit 126, a clock control unit 130, a data outputting unit 140, an input buffer 152, an input buffer status monitoring unit 154, and a data inputting unit 160.

The data processing unit 110 is utilized for processing and outputting data according to an adjustable clock rate. The output buffer 122 is coupled to the data processing unit 110, and utilized for buffering data outputted by the data processing unit 110 according to a first adjustable clock rate, and outputting a first control signal S1 according to a read index and a write index of the output buffer 122. The output buffer status monitoring unit 124 is coupled to the output buffer 122, and utilized for monitoring and obtaining a first remnant data capacity in the output buffer 122 according to the first control signal S1, and outputting the first remnant data capacity.

The input buffer 152 is coupled to the data processing unit 110, and utilized for buffering data outputted by the data inputting unit 160 according to a second adjustable clock rate, and outputting a second control signal S2 according to a read index and a write index of the input buffer 152. The input buffer status monitoring unit 154 is coupled to the input buffer 152, and utilized for monitoring and obtaining a second remnant data capacity in the input buffer 152 according to the second control signal S2, and outputting the second remnant data capacity.

The clock determining unit 126 is coupled to the output buffer status monitoring unit 124 and the input buffer status monitoring unit 154, and utilized for comparing the first remnant data capacity or the second remnant data capacity with a predetermined threshold value or a predetermined threshold range to generate a comparing result. The clock control unit 130 is coupled to the data processing unit 110, the output buffer 122, the clock determining unit 126, the data outputting unit 140, the input buffer 152, and the data inputting unit 160, and utilized for adjusting the adjustable clock rates of the data processing unit 110, the output buffer 122, the data outputting unit 140, the input buffer 152, and the data inputting unit 160 according to the comparing result. In addition, the data processing unit 110 can be a microcontroller processing unit (MCU), a central processing unit (CPU), or a digital signal processor (DSP). The clock determining unit 126 can be a response function, a fixed filter function, an adaptive filter, or an artificial neural network (ANN). The clock control unit 130 can be a frequency dividing (Frequency Divider) circuit, a frequency multiplying (frequency-modulation) circuit, or a phase lock loop (PLL).

Figure 2:
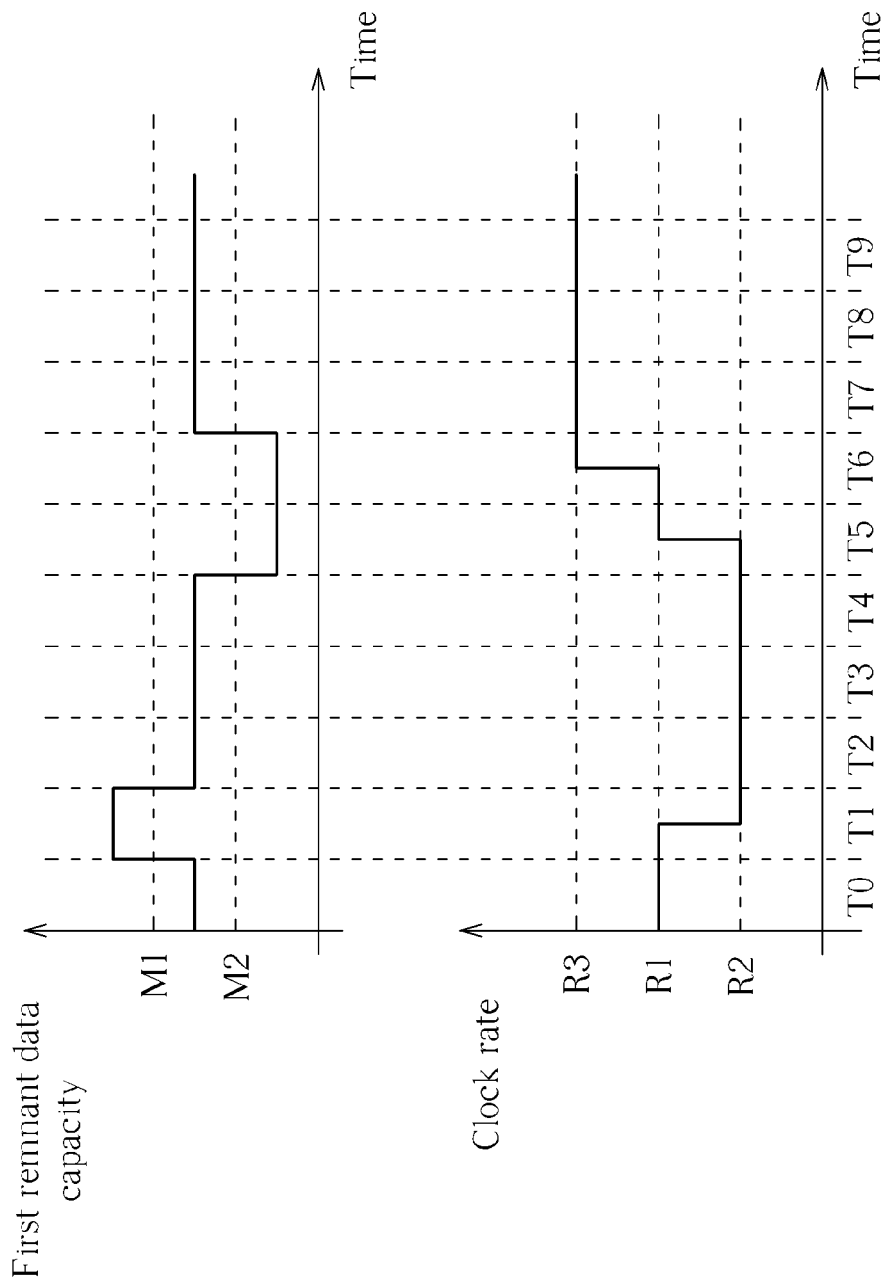
FIG. 2 shows a timing diagram of the first remnant data capacity of the output buffer and the adjustable clock rate of the data processing unit in accordance with the first embodiment of the present invention.

Please refer to FIG. 2, for example, when the power control device 100 is utilized in a multimedia decoding process, FIG. 2 shows a timing diagram of the first remnant data capacity of the output buffer 122 and the adjustable clock rate of the data processing unit 110 in accordance with the first embodiment of the present invention. As shown in FIG. 2, the present invention compares the first remnant data capacity of the output buffer 122 with a predetermined threshold range to generate the comparing result, and the predetermined threshold range comprises a first predetermined threshold value M1 and a second predetermined threshold value M2 smaller than the first predetermined threshold value M1, T0, T1, T2, T3, T4, T5, T6, T7, T8, and T9 are time points (unit of time), respectively, and the duration is ΔT (delta T). The reaction between the first remnant data capacity of the output buffer 122 and the adjustable clock rate of the data processing unit 110 is passive, and thus presumed the passive reaction has a response time ΔT/2. In addition, R1 is an initial rate value of the adjustable clock rate of the data processing unit 110.

As shown in FIG. 2, at first, during T0, the comparing result shows that the first remnant data capacity of the output buffer 122 is not greater than the first predetermined threshold value M1 and not smaller than the second predetermined threshold value M2, and thus the clock control unit 130 does not adjust the adjustable clock rate of the data processing unit 110. Next, during T1, the comparing result shows that the first remnant data capacity of the output buffer 122 is greater than the first predetermined threshold value M1, and thus the clock control unit 130 will reduce the adjustable clock rate of the data processing unit 110 to a first clock rate value R2 after a response time ΔT/2 has passed. Next, during T2 to T4, the comparing result shows that the first remnant data capacity of the output buffer 122 is not greater than the first predetermined threshold value M1 and not smaller than the second predetermined threshold value M2, and thus the clock control unit 130 does not adjust the adjustable clock rate of the data processing unit 110. In other words, the clock control unit 130 maintains the adjustable clock rate of the data processing unit 110 at the first clock rate value R2. Next, during T5, the comparing result shows that the first remnant data capacity of the output buffer 122 is smaller than the second predetermined threshold value M2, and thus the clock control unit 130 will increase the adjustable clock rate of the data processing unit 110 to the initial clock rate value R1 after a response time ΔT/2 has passed. Next, during T6, the comparing result shows that the first remnant data capacity of the output buffer 122 is still smaller than the second predetermined threshold value M2, and thus the clock control unit 130 will increase the adjustable clock rate of the data processing unit 110 to a second clock rate value R3 after a response time ΔT/2 has passed. Next, during a period after T7, the comparing result shows that the first remnant data capacity of the output buffer 122 is not greater than the first predetermined threshold value M1 and not smaller than the second predetermined threshold value M2, and thus the clock control unit 130 does not adjust the adjustable clock rate of the data processing unit 110. In other words, the clock control unit 130 maintains the adjustable clock rate of the data processing unit 110 at the second clock rate value R3.

The capacity variation of the first remnant data capacity of the output buffer 122 represents the requirement variation of the data outputting unit 140, and thus in general, when the first remnant data capacity of the output buffer 122 increases, it means the requirement of the data outputting unit 140 decreases, and thus the clock control unit 130 can reduce the adjustable clock rate of the data processing unit 110. On the contrary, when the first remnant data capacity of the output buffer 122 decreases, it means the requirement of the data outputting unit 140 increases, and thus the clock control unit 130 has to increase the adjustable clock rate of the data processing unit 110. In other words, the clock control unit 130 will determine how to adjust the adjustable clock rate of the data processing unit 110 according to the increasing level or decreasing level of the first remnant data capacity of the output buffer 122, so as to save the power consumption.

Figure 3:
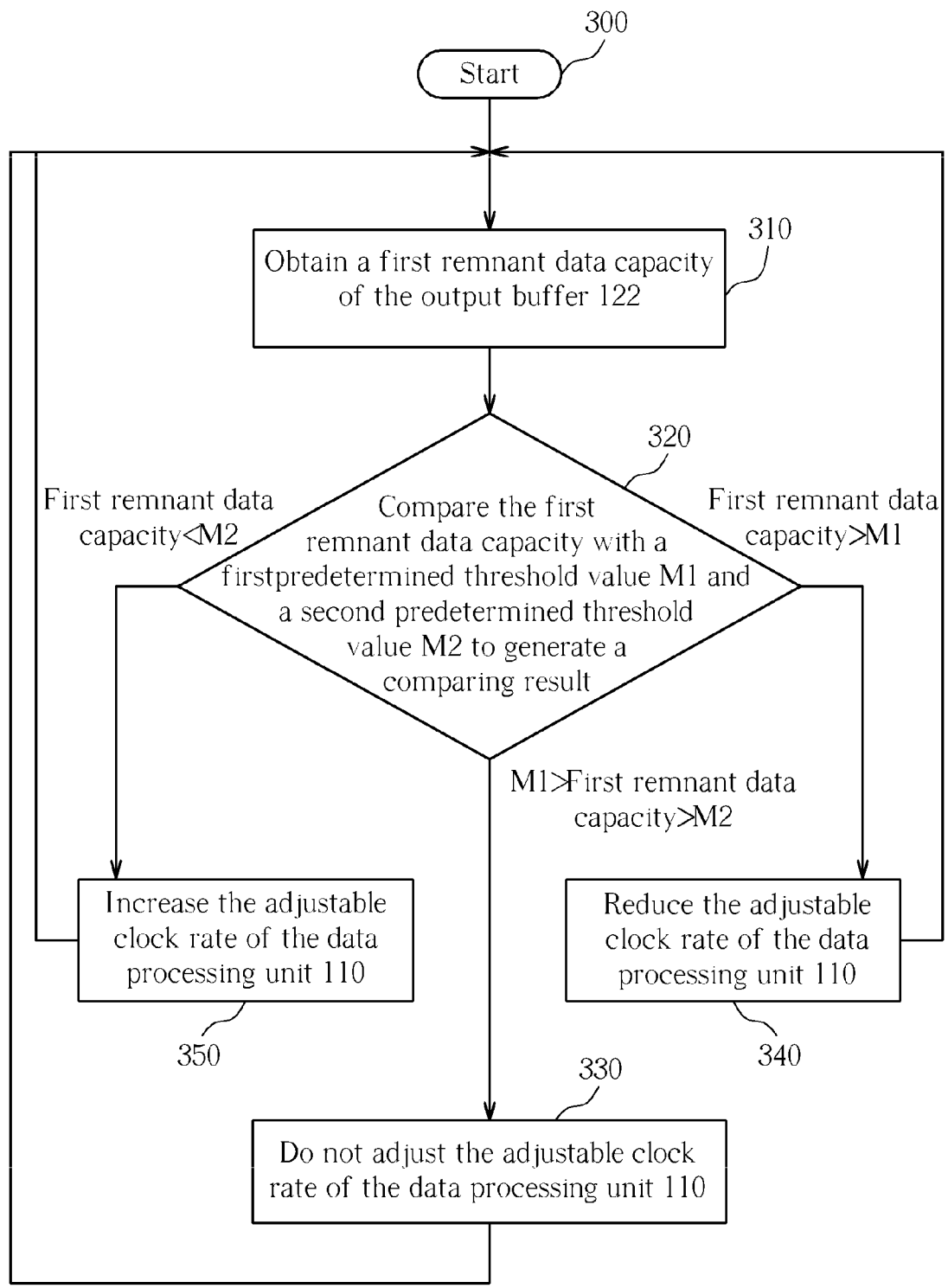
FIG. 3 is a flowchart showing an embodiment of the power control method in accordance with the operation schemes of the power control device shown in FIG. 1 in the present invention.

Please refer to FIG. 3. FIG. 3 is a flowchart showing an embodiment of the power control method in accordance with the operation schemes of the power control device 100 mentioned above in the present invention. Provided that substantially the same result is achieved, the steps of the flowchart of this embodiment need not be in the exact order shown in FIG. 3 and need not be contiguous; that is, other steps can be intermediate. The embodiment of the power control method in the present invention comprises the following steps:

Step 300: Start.

Step 310: Obtain a first remnant data capacity of the output buffer 122.

Step 320: Compare the first remnant data capacity with a first predetermined threshold value M1 and a second predetermined threshold value M2 to generate a comparing result. When the comparing result shows that the first remnant data capacity of the output buffer 122 is not greater than the first predetermined threshold value M1 and not smaller than the second predetermined threshold value M2, go to Step 330; when the comparing result shows that the first remnant data capacity of the output buffer 122 is greater than the first predetermined threshold value M1, go to Step 340; and when the comparing result shows that the first remnant data capacity of the output buffer 122 is smaller than the second predetermined threshold value M2, go to Step 350.

Step 330: Do not adjust the adjustable clock rate of the data processing unit 110, and go back to the Step 310.

Step 340: Reduce the adjustable clock rate of the data processing unit 110, and go back to the Step 310.

Step 350: Increase the adjustable clock rate of the data processing unit 110, and go back to the Step 310.

Figure 4:
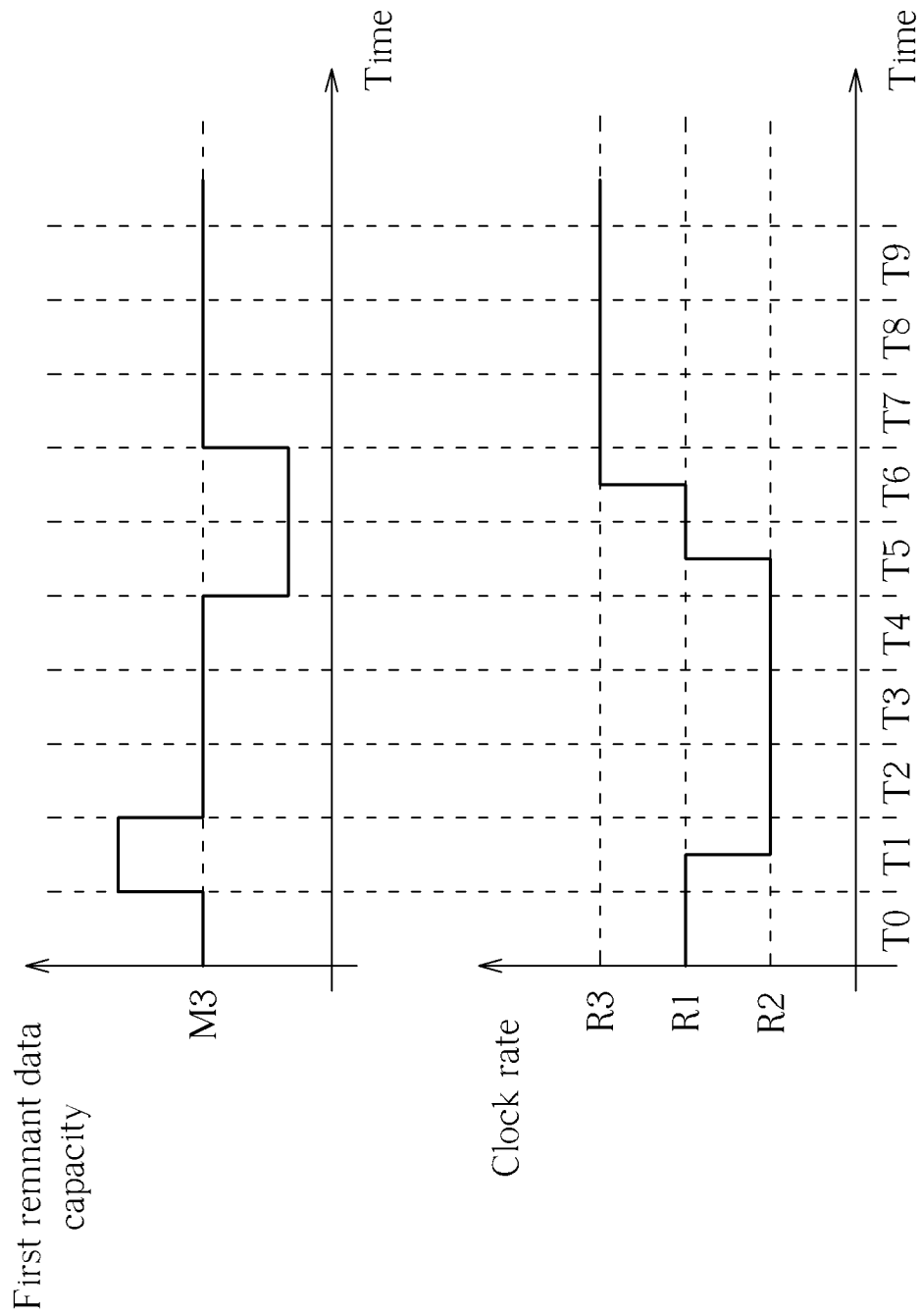
FIG. 4 shows a timing diagram of the first remnant data capacity of the output buffer and the adjustable clock rate of the data processing unit in accordance with the first embodiment of the present invention.

In addition, please note that the above embodiment is only for an illustrative purpose and is not meant to be a limitation of the present invention. For example, please refer to FIG. 4. FIG. 4 shows a timing diagram of the first remnant data capacity of the output buffer 122 and the adjustable clock rate of the data processing unit 110 in accordance with the first embodiment of the present invention. As shown in FIG. 4, the present invention compares the first remnant data capacity of the output buffer 122 with a predetermined threshold value M3 to generate the comparing result. T0, T1, T2, T3, T4, T5, T6, T7, T8, and T9 are time points (unit of time), respectively, and the duration is ΔT. The reaction between the first remnant data capacity of the output buffer 122 and the adjustable clock rate of the data processing unit 110 is passive, and thus presumed the passive reaction has a response time ΔT/2. In addition, R1 is an initial rate value of the adjustable clock rate of the data processing unit 110.

As shown in FIG. 4, at first, during T0, the comparing result shows that the first remnant data capacity of the output buffer 122 is equal to the predetermined threshold value M3, and thus the clock control unit 130 does not adjust the adjustable clock rate of the data processing unit 110. Next, during T1, the comparing result shows that the first remnant data capacity of the output buffer 122 is greater than the predetermined threshold value M3, and thus the clock control unit 130 will reduce the adjustable clock rate of the data processing unit 110 to a first clock rate value R2 after a response time ΔT/2 has passed. Next, during T2 to T4, the comparing result shows that the first remnant data capacity of the output buffer 122 is equal to the predetermined threshold value M3, and thus the clock control unit 130 does not adjust the adjustable clock rate of the data processing unit 110. In other words, the clock control unit 130 maintains the adjustable clock rate of the data processing unit 110 at the first clock rate value R2. Next, during T5, the comparing result shows that the first remnant data capacity of the output buffer 122 is smaller than the predetermined threshold value M3, and thus the clock control unit 130 will increase the adjustable clock rate of the data processing unit 110 to the initial clock rate value R1 after a response time ΔT/2 has passed. Next, during T6, the comparing result shows that the first remnant data capacity of the output buffer 122 is still smaller than the predetermined threshold value M3, and thus the clock control unit 130 will increase the adjustable clock rate of the data processing unit 110 to a second clock rate value R3 after a response time ΔT/2 has passed. Next, during a period after T7, the comparing result shows that the first remnant data capacity of the output buffer 122 is equal to the predetermined threshold value M3, and thus the clock control unit 130 does not adjust the adjustable clock rate of the data processing unit 110. In other words, the clock control unit 130 maintains the adjustable clock rate of the data processing unit 110 at the second clock rate value R3. In other words, the clock control unit 130 also can determine how to adjust the adjustable clock rate of the data processing unit 110 according to the increasing level or decreasing level of the first remnant data capacity of the output buffer 122, so as to save the power consumption.

In addition, when the power control device 100 is utilized during a multimedia decoding process, the clock control unit 130 also can adjust the clock rate of the output buffer 122 and/or data inputting unit 160 in the same way of adjusting the adjustable clock rate of the data processing unit 110 mentioned above, so as to save the power consumption. Similarly, when the power control device 100 is utilized during a multimedia encoding process, the clock control unit 130 also can adjust the clock rate of the input buffer 152 and/or data outputting unit 140 in the same way of adjusting the adjustable clock rate of the data processing unit 110 mentioned above, so as to save the power consumption.

Figure 5:
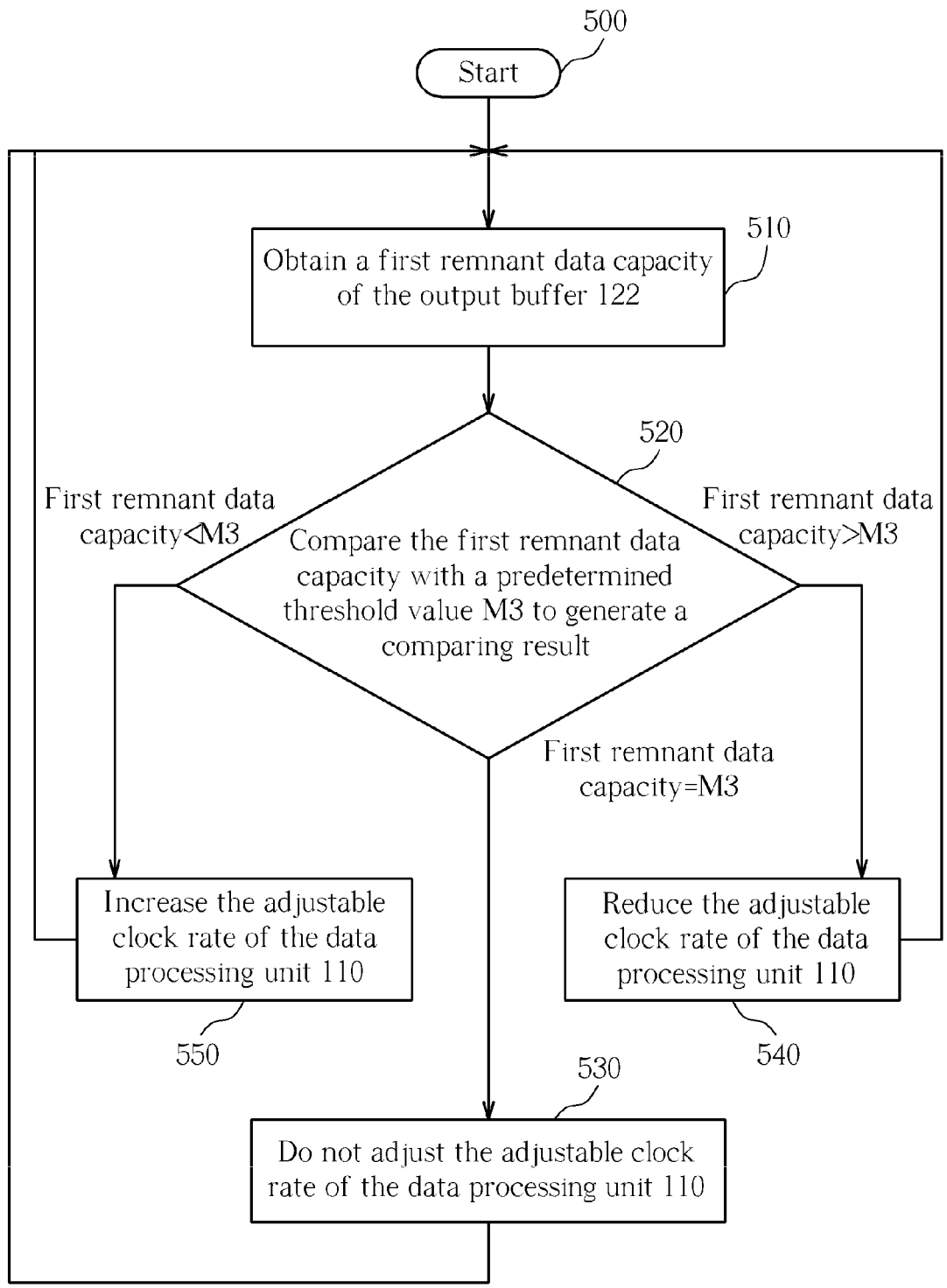
FIG. 5 is a flowchart showing an embodiment of the power control method in accordance with the operation schemes of the power control device shown in FIG. 1 in the present invention.

Please refer to FIG. 5. FIG. 5 is a flowchart showing an embodiment of the power control method in accordance with the operation schemes of the power control device 100 mentioned above in the present invention. Provided that substantially the same result is achieved, the steps of the flowchart of this embodiment need not be in the exact order shown in FIG. 5 and need not be contiguous; that is, other steps can be intermediate. The embodiment of the power control method in the present invention comprises the following steps:

Step 500: Start.

Step 510: Obtain a first remnant data capacity of the output buffer 122.

Step 520: Compare the first remnant data capacity with a predetermined threshold value M3 to generate a comparing result. When the comparing result shows that the first remnant data capacity of the output buffer 122 is equal to the predetermined threshold value M3, go to Step 530; when the comparing result shows that the first remnant data capacity of the output buffer 122 is greater than the predetermined threshold value M3, go to Step 540; and when the comparing result shows that the first remnant data capacity of the output buffer 122 is smaller than the predetermined threshold value M3, go to Step 550.

Step 530: Do not adjust the adjustable clock rate of the data processing unit 110, and go back to the Step 510.

Step 540: Reduce the adjustable clock rate of the data processing unit 110, and go back to the Step 510.

Step 550: Increase the adjustable clock rate of the data processing unit 110, and go back to the Step 510.

Figure 6:
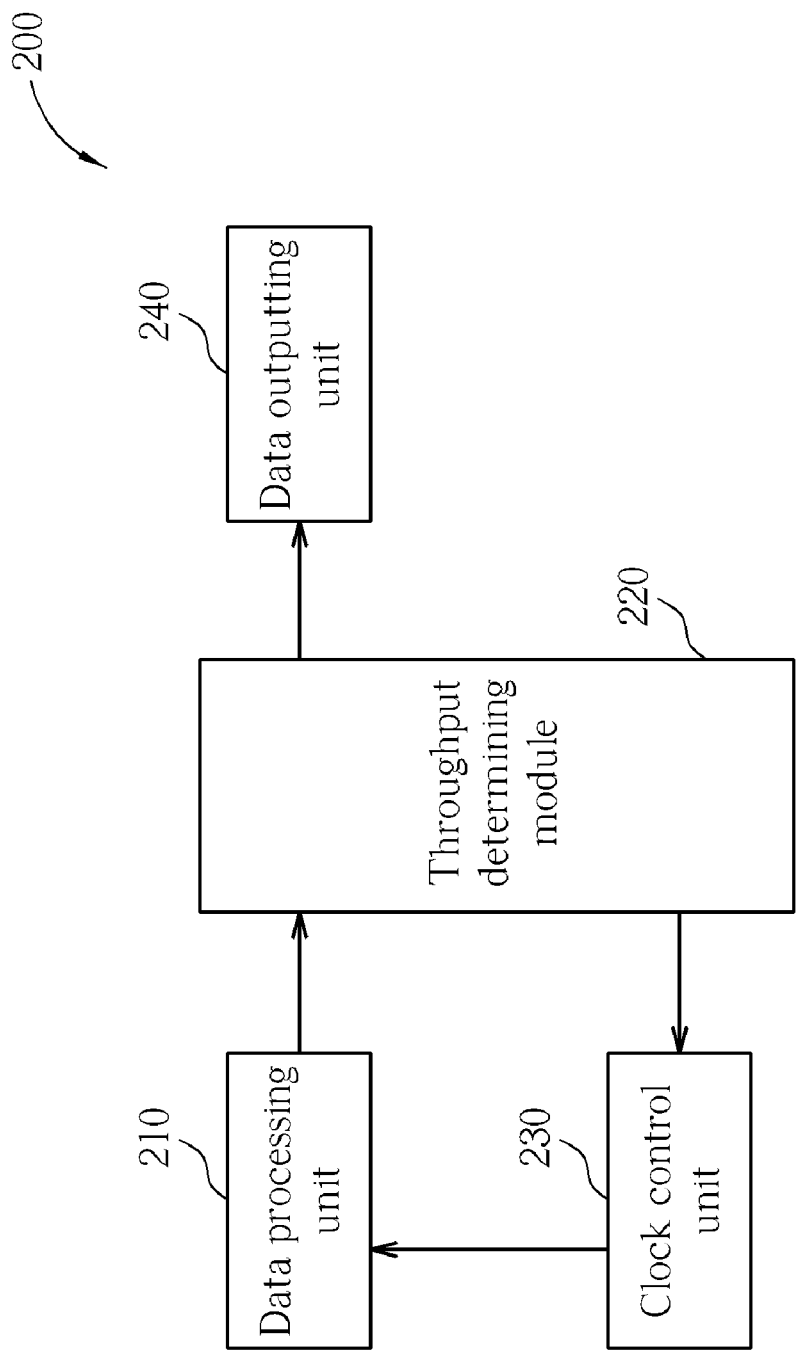
FIG. 6 shows a simplified block diagram of a power control device in accordance with a second embodiment of the present invention.

Please refer to FIG. 6. FIG. 6 shows a block diagram of a power control device 200 in accordance with a second embodiment of the present invention. As shown in FIG. 6, the power control device 200 comprises a data processing unit 210, a throughput determining module 220, a clock control unit 230, and a data outputting unit 240.

The data processing unit 210 is utilized for processing and outputting data according to an adjustable clock rate. The throughput determining module 220 is coupled to the data processing unit 210, and utilized for obtaining an indication value corresponding to a data output rate of the data processing unit and comparing the indication value with at least a predetermined threshold value to generate a comparing result. The clock control unit 230 is coupled to the throughput determining module 220 and the data processing unit 210, and utilized for adjusting the adjustable clock rate of the data processing unit 210 according to the comparing result, so as to save the power consumption.

The data outputting unit 240 is coupled to the throughput determining module 220, and utilized for outputting data according to an output rate, wherein the predetermined threshold value can be a throughput requirement threshold value obtained according to the output rate of the data outputting unit 240, or the data processing unit 210 also can further output a control signal to provide a throughput requirement threshold value to the throughput determining module 220 as the predetermined threshold value. The throughput determining module 220 calculates a throughput corresponding to the data output rate of the data processing unit 210 as the indication value. In addition, the data processing unit 210 can be a microcontroller processing unit (MCU), a central processing unit (CPU), or a digital signal processor (DSP). The throughput determining module 220 can be a processor or a controller. The clock control unit 230 can be a frequency dividing circuit, a frequency multiplying circuit, or a phase lock loop (PLL).

Figure 7:
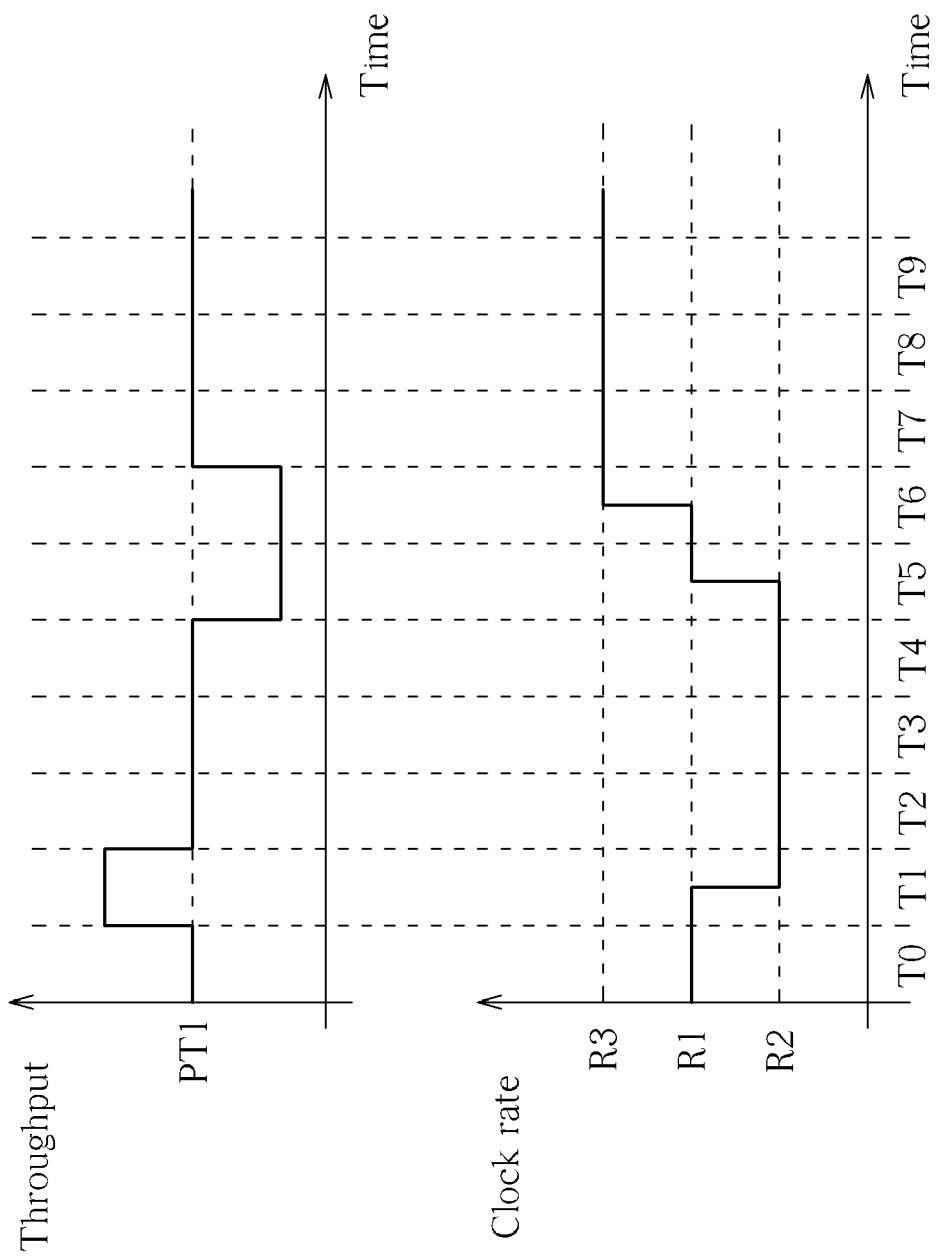
FIG. 7 shows a timing diagram of the throughput of the data processing unit and the adjustable clock rate of the data processing unit in accordance with the first embodiment of the present invention.

For example, when the power control device 200 is utilized in a multimedia decoding process, please refer to FIG. 7. FIG. 7 shows a timing diagram of the throughput of the data processing unit 210 and the adjustable clock rate of the data processing unit 210 in accordance with the second embodiment of the present invention. As shown in FIG. 7, the present invention compares the throughput of the data processing unit 210 with a predetermined threshold value PT1 to generate the comparing result. T0, T1, T2, T3, T4, T5, T6, T7, T8, and T9 are time points, respectively, and the duration is ΔT. The reaction between the throughput of the data processing unit 210 and the adjustable clock rate of the data processing unit 210 is passive, and thus presumed the passive reaction has a response time ΔT/2. In addition, R1 is an initial rate value of the adjustable clock rate of the data processing unit 210.

As shown in FIG. 7, at first, during T0, the comparing result shows that the throughput of the data processing unit 210 is equal to the predetermined threshold value PT1, and thus the clock control unit 230 does not adjust the adjustable clock rate of the data processing unit 210. Next, during T1, the comparing result shows that the throughput of the data processing unit 210 is greater than the predetermined threshold value PT1, and thus the clock control unit 230 will reduce the adjustable clock rate of the data processing unit 210 to a first clock rate value R2 after a response time ΔT/2 has passed. Next, during T2 to T4, the comparing result shows that the throughput of the data processing unit 210 is equal to the predetermined threshold value PT1, and thus the clock control unit 230 does not adjust the adjustable clock rate of the data processing unit 210. In other words, the clock control unit 230 maintains the adjustable clock rate of the data processing unit 210 at the first clock rate value R2. Next, during T5, the comparing result shows that the throughput of the data processing unit 210 is smaller than the predetermined threshold value PT1, and thus the clock control unit 230 will increase the adjustable clock rate of the data processing unit 210 to the initial clock rate value R1 after a response time ΔT/2 has passed. Next, during T6, the comparing result shows that the throughput of the data processing unit 210 is still smaller than the predetermined threshold value PT1, and thus the clock control unit 230 will increase the adjustable clock rate of the data processing unit 210 to a second clock rate value R3 after a response time ΔT/2 has passed. Next, during a period after T7, the comparing result shows that the throughput of the data processing unit 210 is equal to the predetermined threshold value PT1, and thus the clock control unit 230 does not adjust the adjustable clock rate of the data processing unit 210. In other words, the clock control unit 230 maintains the adjustable clock rate of the data processing unit 210 at the second clock rate value R3.

In other words, the predetermined threshold value PT1 represents the average requirement of the data outputting unit 240, and thus in general, when the throughput of the data processing unit 210 is greater than the predetermined threshold value PT1, it means the requirement of the data outputting unit 240 is exceeded, and thus the clock control unit 230 can reduce the adjustable clock rate of the data processing unit 210. On the contrary, when the throughput of the data processing unit 210 is smaller than the predetermined threshold value PT1, it means the requirement of the data outputting unit 240 is not satisfied, and thus the clock control unit 230 has to increase the adjustable clock rate of the data processing unit 210. In other words, the clock control unit 230 will determine how to adjust the adjustable clock rate of the data processing unit 210 according to the increasing level or decreasing level of the throughput of the data processing unit 210, so as to save the power consumption.

Figure 8:
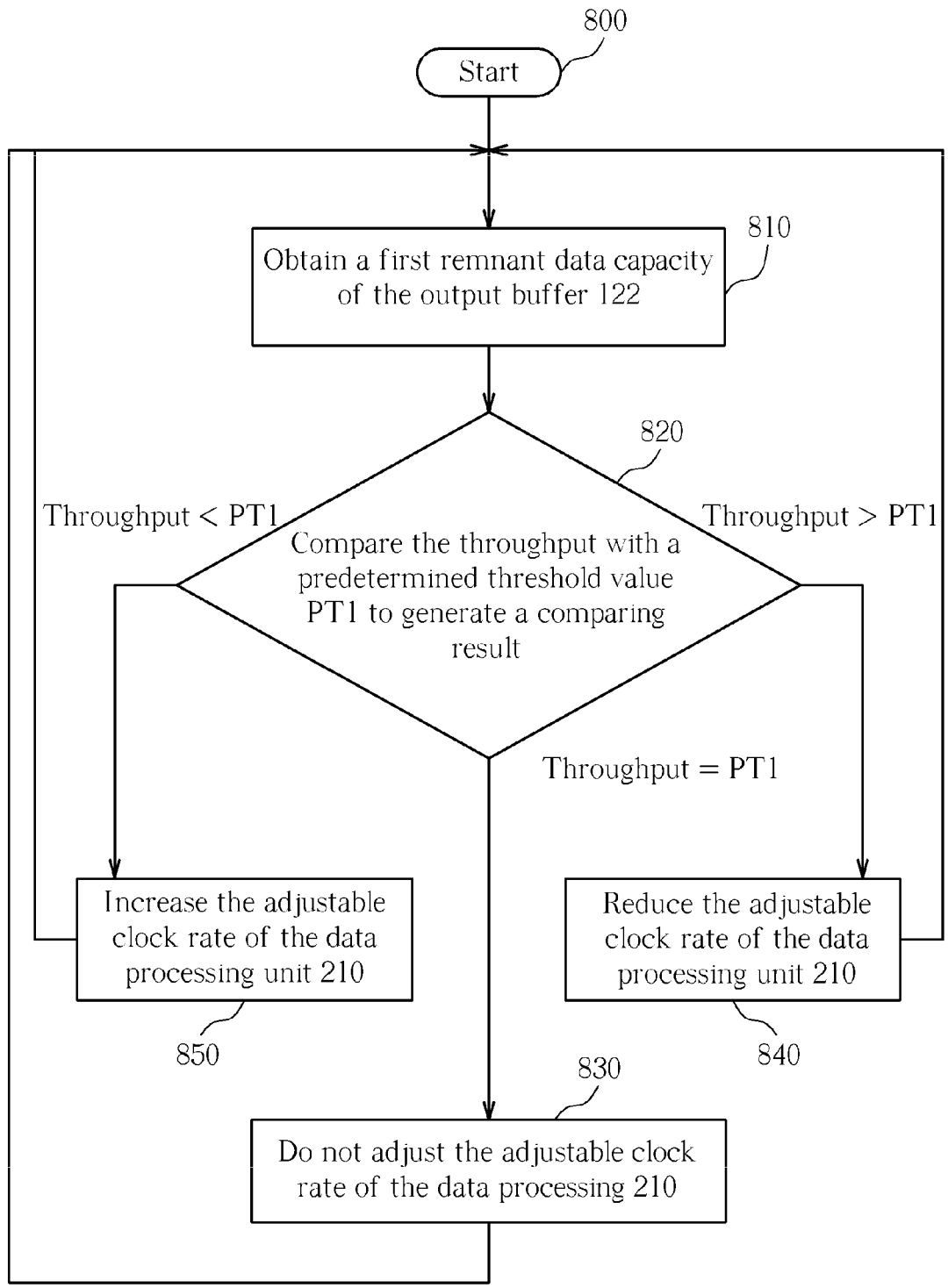
FIG. 8 is a flowchart showing an embodiment of the power control method in accordance with the operation schemes of the power control device shown in FIG. 6 in the present invention.

Please refer to FIG. 8. FIG. 8 is a flowchart showing an embodiment of the power control method in accordance with the operation schemes of the power control device 200 mentioned above in the present invention. Provided that substantially the same result is achieved, the steps of the flowchart of this embodiment need not be in the exact order shown in FIG. 8 and need not be contiguous; that is, other steps can be intermediate. The embodiment of the power control method in the present invention comprises the following steps:

Step 800: Start.

Step 810: Obtain a throughput of the data processing unit 210.

Step 820: Compare the throughput with a predetermined threshold value PT1 to generate a comparing result. When the comparing result shows that the throughput is equal to the predetermined threshold value PT1, go to Step 830; when the comparing result shows that the throughput is greater than the predetermined threshold value PT1, go to Step 840; and when the comparing result shows that the throughput is smaller than the predetermined threshold value PT1, go to Step 850.

Step 830: Do not adjust the adjustable clock rate of the data processing unit 210, and go back to the Step 810.

Step 840: Reduce the adjustable clock rate of the data processing unit 210, and go back to the Step 810.

Step 850: Increase the adjustable clock rate of the data processing unit 210, and go back to the Step 810.

Figure 9:
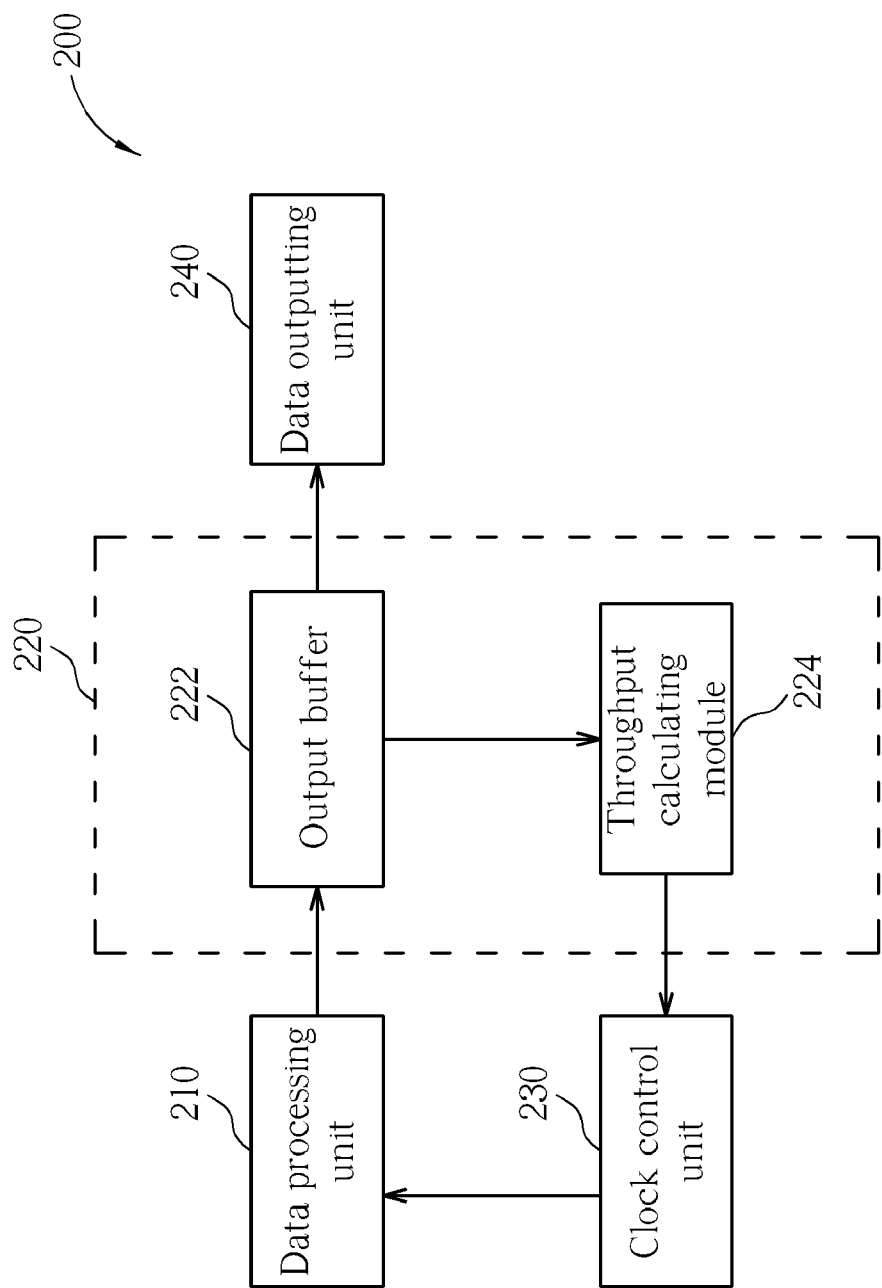
FIG. 9 shows a simplified block diagram of a power control device in accordance with a third embodiment of the present invention.

In addition, in a third embodiment of the present invention, the throughput determining module 220 of the power control device 200 can further comprise a output buffer 222 and a throughput calculating module 224 as shown in FIG. 9.

The output buffer 222 is coupled to the data processing unit 210, and utilized for buffering data outputted by the data processing unit 210 according to an adjustable clock rate, and outputting a control signal according to a read index and a write index of the output buffer 222. The throughput calculating module 224 is coupled to the output buffer 222, and utilized for calculating a throughput of the data processing unit 210 corresponding to the control signal, and comparing the throughput with the throughput requirement threshold value to generate the comparing result. Please note that the above embodiment is only for an illustrative purpose and is not meant to be a limitation of the present invention.

Briefly summarized, the power control device and the power control method applied to a computer system disclosed by the present invention are capable of saving power consumption of the computer system by adjusting clock rate of internal elements (such as the data processing unit, the output buffer, the data outputting unit, the input buffer, and the data inputting unit) of the computer system.

Those skilled in the art will readily observe that numerous modifications and alterations of the device and method may be made while retaining the teachings of the invention.

What is claimed is:

1. A power control device, applied to a computer system, comprising:
   a data processing unit, utilized for processing and outputting data according to an adjustable clock rate;
   a throughput determining module, coupled to the data processing unit, utilized for obtaining an indication value corresponding to a data output rate of the data processing unit and comparing the indication value with at least a predetermined threshold value to generate a comparing result; and
   a clock control unit, coupled between the throughput determining module and the data processing unit, utilized for adjusting the adjustable clock rate of the data processing unit according to the comparing result.

2. The power control device of claim 1, wherein when the comparing result shows that the indication value is equal to the predetermined threshold value, the clock control unit does not adjust the adjustable clock rate of the data processing unit; when the comparing result shows that the indication value is greater than the predetermined threshold value, the clock control unit reduces the adjustable clock rate of the data processing unit; when the comparing result shows that the indication value is smaller than the predetermined threshold value, the clock control unit increases the adjustable clock rate of the data processing unit.

3. The power control device of claim 1, wherein the throughput determining module compares the indication value with a plurality of predetermined threshold values to generate the comparing result; the plurality of predetermined threshold values comprises a first predetermined threshold value and a second predetermined threshold value smaller than the first predetermined threshold value; when the comparing result shows that the indication value is not greater than the first predetermined threshold value and not smaller than the second predetermined threshold value, the clock control unit does not adjust the adjustable clock rate of the data processing unit; when the comparing result shows that the indication value is greater than the first predetermined threshold value, the clock control unit reduces the adjustable clock rate of the data processing unit; when the comparing result shows that the indication value is smaller than the second predetermined threshold value, the clock control unit increases the adjustable clock rate of the data processing unit.

4. The power control device of claim 1, further comprising:
   a data outputting unit, coupled to the throughput determining module, utilized for outputting data according to a second adjustable clock rate;
   wherein the clock control unit further adjusts the second adjustable clock rate of the data outputting unit according to the comparing result.

5. The power control device of claim 1, wherein the throughput determining module calculates a throughput corresponding to the data output rate of the data processing unit as the indication value.

6. The power control device of claim 5, wherein the data processing unit further outputs a control signal to provide at least a throughput requirement threshold value to the throughput determining module as the at least a predetermined threshold value.

7. The power control device of claim 1, wherein the throughput determining module comprises:
   a buffer, coupled to the data processing unit, utilized for buffering data outputted by the data processing unit according to a third adjustable clock rate, and outputting a control signal according to a read index and a write index of the buffer; and
   a throughput calculating module, coupled to the buffer, utilized for calculating a throughput corresponding to the data output rate of the data processing unit as the indication value, and generating the comparing result according to the indication value;
   wherein the clock control unit further adjusts the third adjustable clock rate of the buffer according to the comparing result.

8. The power control device of claim 7, wherein the throughput calculating module comprises:
   a buffer status monitoring unit, coupled to the buffer, utilized for monitoring and obtaining a remnant data capacity in the buffer according to the control signal, and outputting the remnant data capacity as the indication value; and
   a clock determining unit, coupled to the buffer status monitoring unit, utilized for comparing the indication value with the at least a predetermined threshold value to generate the comparing result;
   wherein the clock control unit further adjusts the adjustable clock rate of the data processing unit according to the comparing result.

9. The power control device of claim 1, further comprising:
   a data outputting unit, coupled to the throughput determining module, utilized for outputting data according to a output rate;
   wherein the predetermined threshold value is a throughput requirement threshold value obtained according to the output rate of the data outputting unit, and the throughput determining module calculates a throughput corresponding to the data output rate of the data processing unit as the indication value.

10. A power control method applied to a computer system, wherein the computer system comprises a data processing unit utilized for processing and outputting data according to an adjustable clock rate, the power control method comprising:
    obtaining an indication value corresponding to a data output rate of the data processing unit;
    comparing the indication value with at least a predetermined threshold value to generate a comparing result; and
    adjusting the adjustable clock rate of the data processing unit according to the comparing result.

11. The power control method of claim 10, wherein the step of adjusting the adjustable clock rate of the data processing unit according to the comparing result further comprises:
    when the comparing result shows that the indication value is equal to the predetermined threshold value, determining to not adjust the adjustable clock rate of the data processing unit;
    when the comparing result shows that the indication value is greater than the predetermined threshold value, determining to reduce the adjustable clock rate of the data processing unit; and when the comparing result shows that the indication value is smaller than the predetermined threshold value, determining to increase the adjustable clock rate of the data processing unit.

12. The power control method of claim 10, wherein the step of comparing the indication value with at least a predetermined threshold value to generate the comparing result is comparing the indication value with a plurality of predetermined threshold values to generate the comparing result, wherein the plurality of predetermined threshold values comprises a first predetermined threshold value and a second predetermined threshold value smaller than the first predetermined threshold value; and the step of adjusting the adjustable clock rate of the data processing unit according to the comparing result further comprises:
  when the comparing result shows that the indication value is not greater than the first predetermined threshold value and not smaller than the second predetermined threshold value, determining to not adjust the adjustable clock rate of the data processing unit;
  when the comparing result shows that the indication value is greater than the first predetermined threshold value, determining to reduce the adjustable clock rate of the data processing unit; and
  when the comparing result shows that the indication value is smaller than the second predetermined threshold value, determining to increase the adjustable clock rate of the data processing unit.

13. The power control method of claim 10, wherein the computer system further comprises a data outputting unit utilized for outputting data according to a second adjustable clock rate; and the power control method further comprises:
  adjusting the second adjustable clock rate of the data outputting unit according to the comparing result;
  wherein when the comparing result shows that the indication value is equal to the predetermined threshold value, determining to not adjust the second adjustable clock rate of the data outputting unit;
  when the comparing result shows that the indication value is greater than the predetermined threshold value, determining to reduce the second adjustable clock rate of the data outputting unit; and
  when the comparing result shows that the indication value is smaller than the predetermined threshold value, determining to increase the second adjustable clock rate of the data outputting unit.

14. The power control method of claim 10, wherein the computer system further comprises a data outputting unit utilized for outputting data according to a second adjustable clock rate; and the power control method further comprises
  adjusting the second adjustable clock rate of the data outputting unit according to the comparing result;
  wherein the step of comparing the indication value with at least a predetermined threshold value to generate the comparing result is comparing the indication value with a plurality of predetermined threshold values to generate the comparing result, wherein the plurality of predetermined threshold values comprises a first predetermined threshold value and a second predetermined threshold value smaller than the first predetermined threshold value; and the step of adjusting the adjustable clock rate of the data processing unit according to the comparing result further comprises:
  when the comparing result shows that the indication value is not greater than the first predetermined threshold value and not smaller than the second predetermined threshold value, determining to not adjust the second adjustable clock rate of the data outputting unit;
  when the comparing result shows that the indication value is greater than the first predetermined threshold value, determining to reduce the second adjustable clock rate of the data outputting unit; and
  when the comparing result shows that the indication value is smaller than the second predetermined threshold value, determining to increase the second adjustable clock rate of the data outputting unit.

15. The power control method of claim 10, wherein the step of obtaining the indication value corresponding to the data output rate of the data processing unit comprises:
  calculating a throughput corresponding to the data output rate of the data processing unit as the indication value.

16. The power control method of claim 15, wherein the data processing unit further outputs a control signal to provide at least a throughput requirement threshold value as the at least a predetermined threshold value.

17. The power control method of claim 10, wherein the computer system further comprises:
  a buffer, coupled to the data processing unit, utilized for buffering data outputted by the data processing unit according to a third adjustable clock rate, and outputting a control signal according to a read index and a write index of the buffer; and
  a throughput calculating module, coupled to the buffer, utilized for calculating a throughput corresponding to the data output rate of the data processing unit as the indication value, and generating the comparing result according to the indication value;
  and the power control method further comprises:
  adjusting the third adjustable clock rate of the buffer according to the comparing result.

18. The power control method of claim 17, wherein the throughput calculating module comprises:
  a buffer status monitoring unit, coupled to the buffer, utilized for monitoring and obtaining a remnant data capacity in the buffer according to the control signal, and outputting the remnant data capacity as the indication value; and
  a clock determining unit, coupled to the buffer status monitoring unit, utilized for comparing the indication value with the at least a predetermined threshold value to generate the comparing result;
  wherein the step of adjusting the adjustable clock rate of the data processing unit according to the comparing result further comprises:
  when the comparing result shows that the indication value is equal to the predetermined threshold value, determining to not adjust the adjustable clock rate of the data processing unit;
  when the comparing result shows that the indication value is greater than the predetermined threshold value, determining to reduce the adjustable clock rate of the data processing unit; and
  when the comparing result shows that the indication value is smaller than the predetermined threshold value, determining to increase the adjustable clock rate of the data processing unit.

19. The power control method of claim 10, wherein the computer system further comprises a data outputting unit utilized for outputting data according to a output rate; wherein the predetermined threshold value is a throughput requirement threshold value obtained according to the output rate of the data outputting unit, and the step of obtaining the indication value corresponding to the data output rate of the data processing unit further comprises:

calculating a throughput corresponding to the data output rate of the data processing unit as the indication value;

wherein the step of adjusting the adjustable clock rate of the data processing unit according to the comparing result further comprises:

when the comparing result shows that the indication value is equal to the predetermined threshold value, determining to not adjust the adjustable clock rate of the data processing unit;

when the comparing result shows that the indication value is greater than the predetermined threshold value, determining to reduce the adjustable clock rate of the data processing unit; and when the comparing result shows that the indication value is smaller than the predetermined threshold value, determining to increase the adjustable clock rate of the data processing unit.

* * * * *